(12) United States Patent
Omura et al.

(10) Patent No.: US 11,374,288 B2
(45) Date of Patent: Jun. 28, 2022

(54) BUSBAR AND BATTERY LAMINATE

(71) Applicant: Panasonic Intellectual Property Management Co., Ltd., Osaka (JP)

(72) Inventors: Tetsuji Omura, Hyogo (JP); Shingo Kume, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 16/640,346

(22) PCT Filed: Dec. 7, 2018

(86) PCT No.: PCT/JP2018/045030
§ 371 (c)(1),
(2) Date: Feb. 19, 2020

(87) PCT Pub. No.: WO2019/124109
PCT Pub. Date: Jun. 27, 2019

(65) Prior Publication Data
US 2020/0358068 A1 Nov. 12, 2020

(30) Foreign Application Priority Data

Dec. 19, 2017 (JP) .............................. JP2017-243050

(51) Int. Cl.
*H01M 50/502* (2021.01)
*H01M 10/647* (2014.01)
(Continued)

(52) U.S. Cl.
CPC ..... *H01M 50/502* (2021.01); *H01M 10/0413* (2013.01); *H01M 10/647* (2015.04);
(Continued)

(58) Field of Classification Search
CPC .. H01M 50/20; H01M 50/543; H01M 50/502; H01M 50/574; H01M 50/578; H02G 5/005
See application file for complete search history.

(56) References Cited

U.S. PATENT DOCUMENTS

2009/0274956 A1* 11/2009 Kosugi ............... H01M 50/502
174/68.2
2011/0076521 A1* 3/2011 Shimizu ............... H01M 10/425
429/7
(Continued)

FOREIGN PATENT DOCUMENTS

CN          104064722 A      9/2014
JP          2012-018904      1/2012
(Continued)

OTHER PUBLICATIONS

International Search Report of PCT application No. PCT/JP2018/045030 dated Mar. 12, 2019.
(Continued)

*Primary Examiner* — Matthew T Martin
*Assistant Examiner* — Adam J Francis
(74) *Attorney, Agent, or Firm* — McDermott Will & Emery LLP

(57) ABSTRACT

A busbar includes a plurality of sheets stacked together. The busbar includes: a main body that extends along an axis along which batteries are stacked together; and a plurality of connectors that are each thinner than the main body, and are welded to terminals of the batteries, respectively.

13 Claims, 9 Drawing Sheets

(51) Int. Cl.
*H01M 10/04* (2006.01)
*H02G 5/00* (2006.01)
*H01M 50/20* (2021.01)
*H01M 50/543* (2021.01)

(52) U.S. Cl.
CPC ......... *H01M 50/20* (2021.01); *H01M 50/543* (2021.01); *H02G 5/005* (2013.01)

(56) References Cited

U.S. PATENT DOCUMENTS

| | | |
|---|---|---|
| 2011/0303459 A1 | 12/2011 | Chuang |
| 2012/0009461 A1* | 1/2012 | Kim .................... H01M 50/502 |
| | | 429/158 |
| 2014/0284077 A1* | 9/2014 | Sakai ...................... H01L 24/34 |
| | | 174/126.2 |
| 2019/0020011 A1 | 1/2019 | Yamanaka et al. |
| 2019/0379015 A1* | 12/2019 | Ochi .................... H01M 50/20 |
| 2020/0106073 A1 | 4/2020 | Fujita |

FOREIGN PATENT DOCUMENTS

| | | |
|---|---|---|
| JP | 2019-021403 | 2/2019 |
| WO | 2019/003928 | 1/2019 |

OTHER PUBLICATIONS

English Translation of Chinese Office Action dated Mar. 23, 2022 for the related Chinese Patent Application No. 201880053606.8.

* cited by examiner

BUSBAR AND BATTERY LAMINATE

TECHNICAL FIELD

The present invention relates to a busbar and a battery module.

BACKGROUND ART

A battery module is known as a battery used as a power source that needs to generate high voltage. The power source that needs to generate high voltage is used for a vehicle, for example. The battery module includes a plurality of batteries electrically connected with each other. In such a conventional battery module, terminals of batteries that are adjacent to each other are connected with each other by a busbar.

A known busbar includes a plurality of sheets stacked together (see PTL 1, for example). Since the busbar includes the plurality of sheets stacked together, rigidity of the busbar is reduced. Consequently, the busbar absorbs a force applied to connectors of the busbar that connect the busbar with batteries. For example, the force is generated by vibration of the batteries. Consequently, the busbar is more securely connected with the batteries.

CITATION LIST

Patent Literature

PTL 1: Unexamined Japanese Patent Publication No. 2012-18904

SUMMARY OF THE INVENTION

The inventors of the present invention have earnestly studied busbars that each include sheets stacked together. Consequently, the inventors of the present invention have recognized following problems. That is to say, gaps may be generated between a plurality of sheets stacked together. When the busbar is welded to a terminal, the gaps between the sheets reduce heat transfer. Consequently, it is difficult to securely weld the busbar to the terminal. To allow the busbar to stably electrically connect batteries with each other, it is desirable to more securely weld the busbar to the batteries.

The present invention is made in view of the above situation. It is an object of the present invention to provide a technique that allows batteries to be more securely welded to a busbar that includes sheets stacked together.

An aspect of the present invention is a busbar. The busbar includes a plurality of sheets stacked together. The busbar includes: a main body that extends along an axis along which batteries are stacked together; and a plurality of connectors that are each thinner than the main body, and are welded to terminals of the batteries, respectively.

Another aspect of the present invention is a battery module. The battery module includes: the busbar according to the above aspect; and a plurality of batteries that are electrically connected with each other by the busbar.

Any combination of the above components is also an effective aspect of the present invention. Further, the present invention is expressed in forms of methods, devices, and systems. The methods, devices, and systems are also effective aspects of the present invention.

The present invention allows batteries to be more securely welded to a busbar that includes sheets stacked together.

DESCRIPTION OF EMBODIMENTS

Figure 1:
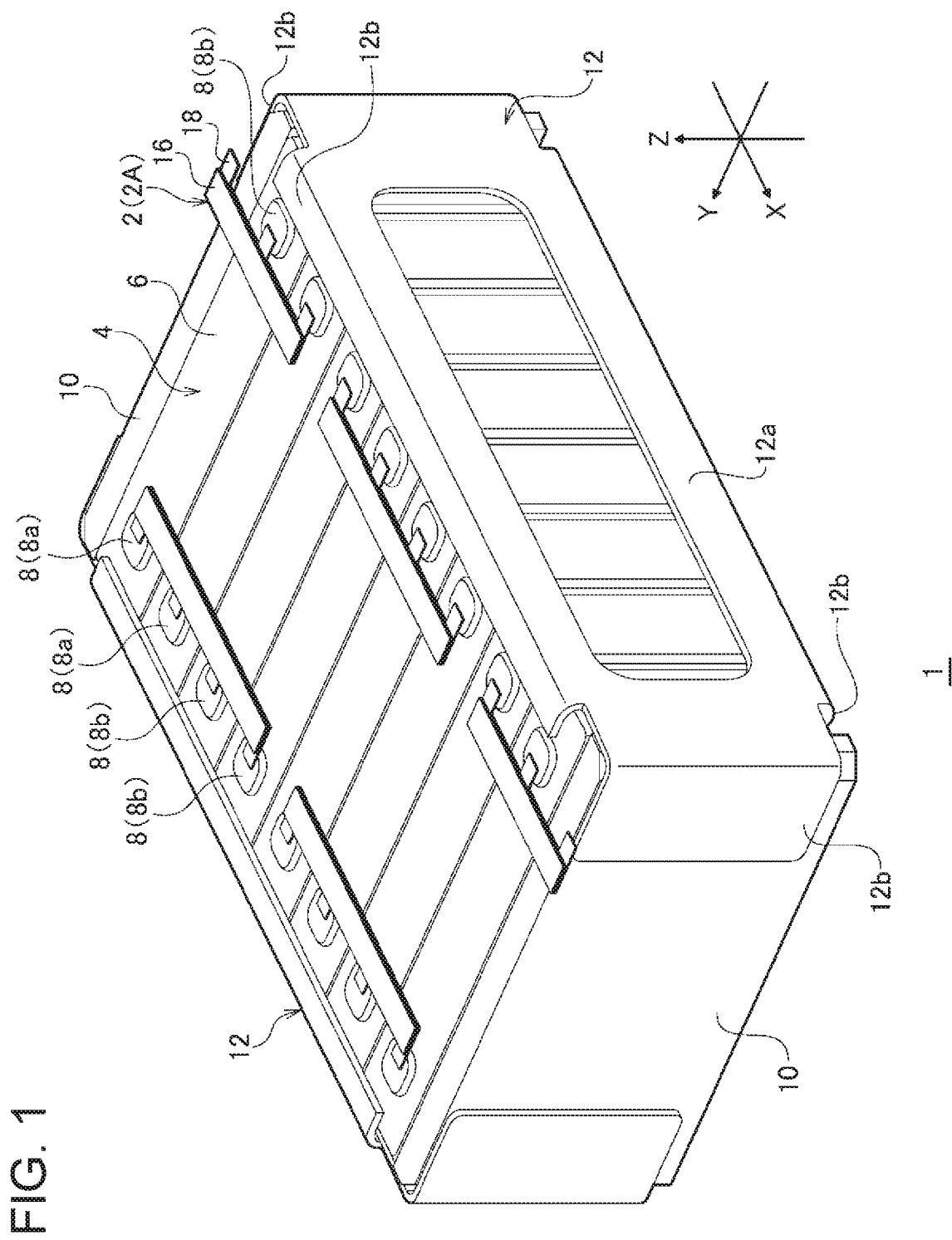
FIG. 1 is a schematic perspective view that illustrates a configuration of a battery module that includes busbars according to a first exemplary embodiment.

Hereinafter, the present invention will be described based on preferred exemplary embodiments with reference to the drawings. The exemplary embodiments are exemplifications and do not limit the invention. All features described in the exemplary embodiments and combinations of the features are not necessarily essential to the invention. The same reference marks are assigned to the same or equivalent components, members, and processes illustrated in the drawings. Explanation for the same or equivalent components, members, and processes will not be repeated as appropriate. For convenience, scales or shapes of portions illustrated in the drawings are determined to facilitate explanation of the portions. The scales or shapes of the portions should not be interpreted as limitation unless otherwise mentioned. Further, some components may be illustrated on slightly different scales in different drawings. Further, if terms "first", "second", and the like are used in the present description or claims, the terms "first", "second", and the like do not mean any order or importance, but are used to distinguish between one configuration and another configuration unless otherwise mentioned.

First Exemplary Embodiment

FIG. 1 is a schematic perspective view that illustrates a configuration of a battery module that includes busbars according to a first exemplary embodiment. Battery module (=battery stack) 1 includes a plurality of busbars 2 (2A), and a plurality of batteries 4 electrically connected with each other by busbars 2.

For example, each of batteries 4 is a rechargeable secondary battery, such as a lithium-ion battery, a nickel-metal hydride battery, or a nickel-cadmium battery. Each of batteries 4 is what is called a prismatic (=rectangular) battery.

Each of batteries 4 has an exterior can that has a shape like a flat rectangular prism. One side of the exterior can has a substantially rectangular opening that is not illustrated. Electrodes and electrolyte are inserted into the exterior can through the opening. Sealing sheet 6 is attached to the opening of the exterior can. Sealing sheet 6 seals the exterior can. Positive terminal 8 protrudes from one of two lengthways ends of sealing sheet 6. Negative terminal 8 protrudes from the other lengthways end of sealing sheet 6. Hereinafter, positive terminal 8 is referred to as positive terminal 8a, as appropriate. Further, negative terminal 8 is referred to as negative terminal 8b, as appropriate. If polarity of terminals 8 does not need to be distinguished, positive terminals 8a and negative terminals 8b are collectively referred to as terminals 8.

Terminals 8 protrude from respective openings of sealing sheet 6. A gasket as a seal is disposed between a periphery of each of terminals 8 and the opening of sealing sheet 6. The gasket tightly fills a gap between sealing sheet 6 and terminal 8. Further, the gasket does not allow a short circuit between sealing sheet 6 and terminal 8. The exterior can, sealing sheet 6, and terminals 8 are electrical conductors, and are made of metal, for example. The gasket is an insulator and is made of resin, for example. Sealing sheet 6 includes a safety valve (not illustrated) between the pair of terminals 8. If a pressure rises to or above a predetermined value in the exterior can, the safety valve opens to release gas in the exterior can.

In the present exemplary embodiment, a top of battery 4 includes sealing sheet 6, and a bottom of battery 4 is opposite the top of battery 4. Further, battery 4 has two main sides that each connect the top of battery 4 with the bottom of battery 4. Of six sides of battery 4, the main sides each have the largest area. In addition to the top, the bottom, and the two main sides, battery 4 has two sides. The tops of batteries 4 constitute a top of battery module 1. The bottoms of batteries 4 constitute a bottom of battery module 1. The sides of batteries 4 constitute sides of battery module 1. For convenience, assume that the top of battery module 1 is a vertically upper side of battery module 1, and the bottom of battery module 1 is a vertically lower side of battery module 1.

The plurality of batteries 4 are stacked together at predetermined intervals. Main sides of batteries 4 that are adjacent to each other are in contact with each other. The terms "stacked together" mean that a plurality of components are arranged along any one axis. Therefore, stacking batteries 4 together may mean horizontally arranging the plurality of batteries 4. Further, batteries 4 are arranged in such a manner that terminals 8 face in a same direction. For convenience, terminals 8 face upward along vertical axis Z (an axis indicated by arrow Z in FIG. 1).

The plurality of batteries 4 are divided into a plurality of battery units. Each of the plurality of battery units includes at least two batteries 4. Busbars 2 connect batteries 4 of each of the battery units with each other in parallel. Further, busbars 2 connect the battery units with each other in series. In the present exemplary embodiment, each of the battery units includes two batteries 4 stacked together in such a manner that positive terminals 8a of batteries 4 are adjacent to each other. A number of the battery units is four. The four battery units are stacked together in such a manner that positive terminal 8a of one of two of the battery units that are adjacent to each other is adjacent to negative terminal 8b of the other battery unit. Busbars 2 connect positive terminals 8a or negative terminals 8b of each of the battery units with each other in parallel. Further, busbars 2 connect positive terminal 8a and negative terminal 8b of two of the battery units that are adjacent to each other with each other in series.

Busbars 2 are substantially elongated metallic components. Busbars 2 are electrically connected with terminals 8 of batteries 4 by welding. A configuration of busbars 2 will be described in detail later.

Battery module 1 includes a plurality of separators not illustrated. The separators are also referred to as insulating spacers. The separators are made of a resin that has an insulation property, for example. For example, the separators are made of a thermoplastic resin, such as polypropylene (PP), polybutylene terephthalate (PBT), a polycarbonate (PC), NORYL (registered trademark) resin (modified polyphenylene ether (PPE)). The separators are arranged between batteries 4, and are arranged between battery 4 and each of end plates 10, respectively. End plates 10 will be described later. Consequently, exterior cans of batteries 4 that are adjacent to each other are insulated from each other. Further, the exterior cans of batteries 4 are insulated from end plates 10.

Battery module 1 also includes the pair of end plates 10. End plates 10 are each made of a metal sheet, for example. The plurality of batteries 4 and the plurality of separators that have been stacked together are disposed between the pair of end plates 10. The pair of end plates 10 are each disposed along axis X along which batteries 4 are stacked together (an axis indicated by arrow X in FIG. 1). The pair of end plates 10 are adjacent to outermost batteries 4, respectively. However, the separator is between each of the pair of end plates 10 and outermost battery 4. Outermost busbars 2 along axis X along which batteries 4 are stacked together also function as terminals connectable with other components.

Battery module 1 also includes a pair of binding components 12. The pair of binding components 12 bind batteries 4, the separators, and end plates 10 that have been stacked together. The pair of binding components 12 are also referred to as binding bars. The pair of binding components 12 are each disposed along horizontal axis Y (an axis indicated by arrow Y in FIG. 1) that is perpendicular to axis X along which the plurality of batteries 4 are stacked together. Along horizontal axis Y, terminals 8 are arranged in each of batteries 4. Each of binding components 12 has flat portion 12a and bent portions 12b. Flat portion 12a is rectangular and is parallel to sides of batteries 4. Bent portions 12b protrude from ends of sides of flat portion 12a, respectively, toward batteries 4. For example, each of binding components 12 is a rectangular metal sheet whose sides are bent.

Two bent portions 12b that are opposite each other along axis X along which batteries 4 are stacked together are fixed to the pair of end plates 10, respectively, with screws, for example. Consequently, the pair of end plates 10 and the pair of binding components 12 bind the plurality of batteries 4 and the plurality of separators together. Binding components 12 bind the plurality of batteries 4 along axis X along which batteries 4 are stacked together. Consequently, binding components 12 position the plurality of batteries 4 along axis X along which batteries 4 are stacked together. Further, bottoms of the plurality of batteries 4 are in contact with lower bent portions 12b of binding components 12. However, separators are disposed between the bottoms of the plurality of batteries 4 and lower bent portions 12b of binding components 12. Tops of the plurality of batteries 4 are in contact with upper bent portions 12b of binding components 12. However, separators are disposed between the tops of the plurality of batteries 4 and upper bent portions 12b of binding components 12. Consequently, the plurality of batteries 4 are vertically positioned. Then busbars 2 are electrically connected with terminals 8 of batteries 4. Consequently, battery module 1 is made.

Next, busbar 2 according to the present exemplary embodiment will be described in detail.

Figure 2A:
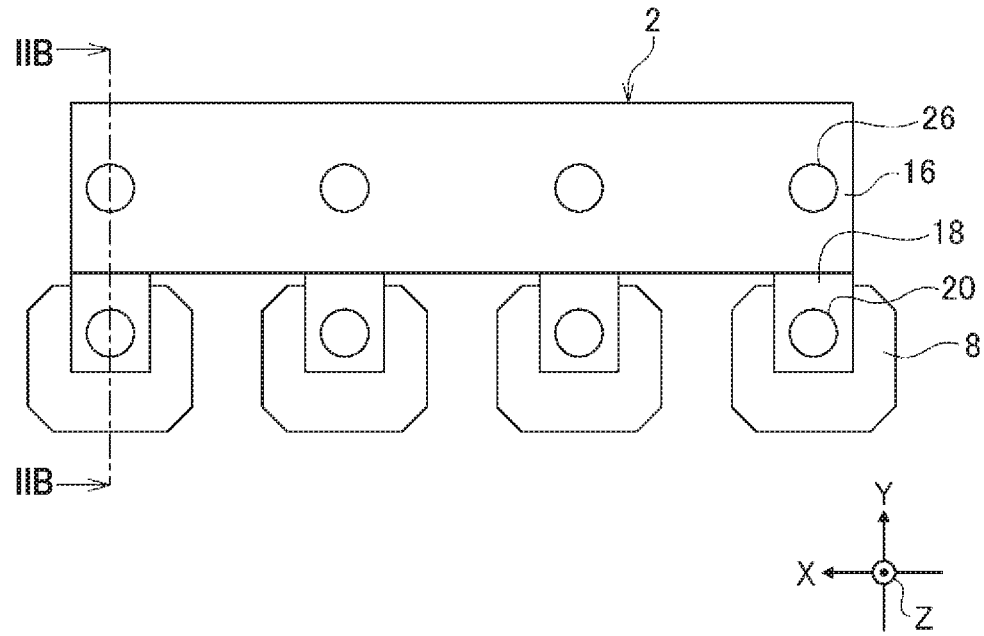
FIG. 2A is a schematic plan view that illustrates a configuration of one of the busbars.
Figure 2B:
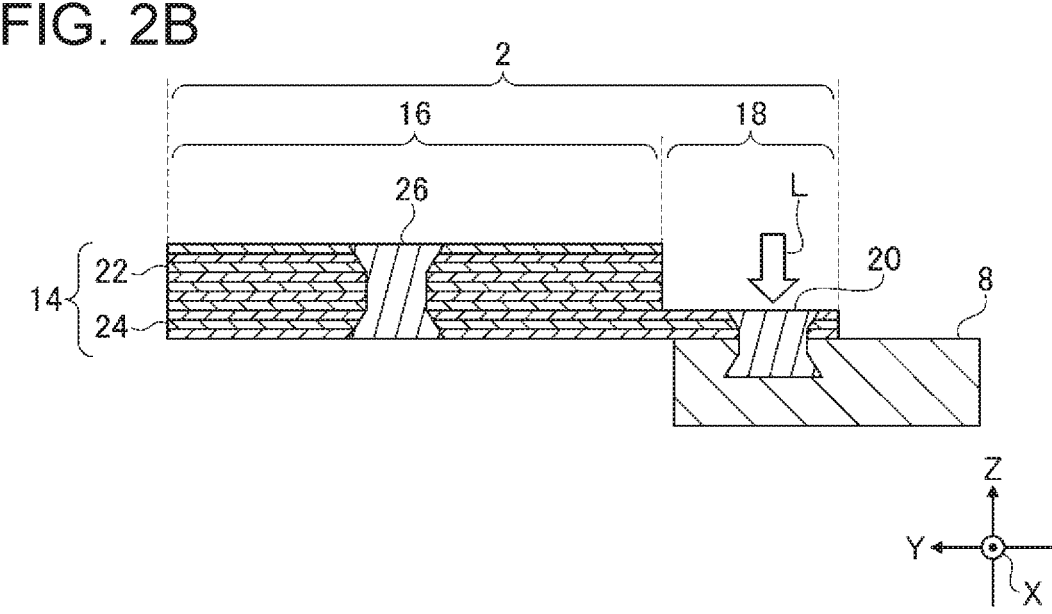
FIG. 2B is a cross-sectional view taken along line IIB-IIB in FIG. 2A.

FIG. 2A is a schematic plan view that illustrates a configuration of one of the busbars. FIG. 2B is a cross-sectional view taken along line IIB in FIG. 2A. Busbar 2 has main body 16 and a plurality of connectors 18. Main body 16 is elongated and extends along axis X along which batteries 4 are stacked together. The plurality of connectors 18 are welded to terminals 8 of batteries 4, respectively. The plurality of connectors 18 are each thinner than main body 16. Connectors 18 are arranged at predetermined intervals along an axis along which main body 16 extends (axis X along which batteries 4 are stacked together). Connectors 18 protrude from main body 16 along an axis that intersects with the axis along which main body 16 extends (horizontal axis Y).

Connectors 18 are in contact with terminals 8 of the plurality of batteries 4, respectively. Connectors 18 are joined to respective terminals 8 by welding. For example, laser beam L is emitted onto an end of each of connectors 18. Consequently, first welded portions 20 are made at the ends of connectors 18, respectively. First welded portions 20 join connectors 18 to terminals 8, respectively. As illustrated in FIG. 1, in the present exemplary embodiment, main body 16 of busbar 2 is closer to centers of batteries 4 along horizontal axis Y than terminals 8 are. Further, connectors 18 of busbar 2 protrude toward sides of batteries 4. Main body 16 may be closer to sides of batteries 4 along horizontal axis Y than terminals 8 are.

Further, busbar 2 includes a plurality of sheets 14 stacked together. The plurality of sheets 14 include first sheets 22 and second sheets 24. First sheets 22 constitute main body 16. Second sheets 24 constitute main body 16 and the plurality of connectors 18. Accordingly, first sheets 22 are elongated, and second sheets 24 each have a shape like a comb. Sheets 14 are made of a metal, such as copper or aluminum. A thickness of each of sheets 14 is 0.1 mm, for example. In the present exemplary embodiment, the plurality of second sheets 24 constitute connectors 18. Further, the plurality of first sheets 22 and the plurality of second sheets 24 constitute main body 16.

Main body 16 has second welded portions 26. Second welded portions 26 join the plurality of sheets 14 that constitute main body 16. That is to say, second welded portions 26 join the plurality of first sheets 22 and the plurality of second sheets 24 to each other. Second welded portions 26 join all sheets 14 of busbar 2 together. The plurality of second sheets 24 that constitute connectors 18 are also joined together by first welded portions 20 that join connectors 18 to terminals 8, respectively. Second welded portions 26 are made in main body 16 by emitting laser beam onto main body 16 that includes the plurality of first sheets 22 and the plurality of second sheets 24 that are stacked together.

In FIG. 2B, busbar 2 includes the plurality of first sheets 22 and the plurality of second sheets 24 that are stacked together. A number of first sheets 22 and a number of second sheets 24 are not particularly limited. The number of first sheets 22 and the number of second sheets 24 are appropriately determined. For example, the number of first sheets 22 and the number of second sheets 24 depend on a necessary thickness of main body 16 and a necessary thickness of connectors 18. Preferably, a thickness of main body 16 is twice or more as large as a thickness of connectors 18. Consequently, main body 16 allows larger electric current to flow through main body 16 when batteries 4 of each of the battery units are connected with each other in parallel, and the battery units are connected with each other in series.

As described above, in the present exemplary embodiment, busbar 2 includes the plurality of sheets 14 stacked together. Busbar 2 has main body 16 that extends along axis X along which batteries 4 are stacked together. Busbar 2 also has the plurality of connectors 18 that are each thinner than main body 16 and are welded to terminals 8 of batteries 4, respectively. A total thickness of each of connectors 18 is smaller than a total thickness of main body 16. Therefore, a number of sheets 14 that constitute connectors 18 is reduced. Therefore, a number of gaps between the sheets is reduced. The gaps between the sheets are thermal resistance that reduces heat transfer at a time of welding.

Connectors 18 are each thin, and a number of gaps between the sheets of each of connectors 18 is reduced. Therefore, heat is sufficiently transferred from connector 18 to terminal 8 when connector 18 is welded to terminal 8. Consequently, busbar 2 is more securely welded to terminals 8. Consequently, busbar 2 stably electrically connects batteries 4 with each other. Further, power of laser beam does not need to be increased to securely weld busbar 2 to terminals 8. Consequently, heat is less likely to damage batteries 4 at a time of welding.

Further, since busbar 2 is welded to terminals 8, contact resistance between busbar 2 and each of terminals 8 is reduced. Consequently, less heat is generated at the connectors that connect busbar 2 with terminals 8. Therefore, battery module 1 more efficiently uses energy. Further, heat less decreases performance of batteries 4. Therefore, busbars 2 according to the present exemplary embodiment increase performance of battery module 1 that includes busbars 2.

Further, busbar 2 includes the plurality of sheets 14 stacked together. Consequently, busbar 2 becomes more flexible. Consequently, a load applied to first welded portions 20 is reduced. For example, the load is applied by vibration of batteries 4. Consequently, busbars 2 are more securely connected with batteries 4.

Further, the plurality of sheets 14 include first sheets 22 that constitute main body 16, and second sheets 24 that constitute main body 16 and the plurality of connectors 18. Due to the two kinds of sheets, a number of sheets that constitute main body 16 is different from a number of sheets that constitute connectors 18. Therefore, main body 16 that is thicker and connectors 18 that are thinner are easily made.

Further, main body 16 has second welded portions 26 that join the plurality of sheets 14 together that constitute main body 16. Second welded portions 26 are separate from first welded portions 20 that join busbar 2 to terminals 8. That is to say, in busbar 2 according to the present exemplary embodiment, positions where sheets 14 are welded together are different from positions where busbar 2 is welded to terminals 8. Second welded portions 26 are made before first welded portions 20 are made. That is to say, second welded portions 26 are made before busbar 2 is welded to terminals 8.

Therefore, damage to batteries 4 caused by heat does not need to be considered when sheets 14 are welded together. Therefore, sheets 14 are welded together with powerful laser beam. Alternatively, another powerful welding technique is used instead of laser beam welding. Consequently, sheets 14 are more securely joined together. Further, since sheets 14 are more securely joined together, a total number of sheets 14 is increased. Consequently, more electric current is allowed to flow through busbar 2. On the other hand, second welded portions 26 securely join sheets 14 together. Therefore, first welded portions 20 do not need to join sheets 14 together. Therefore, a total number of sheets 14 that constitute terminals 8 (second sheets 24) is reduced. Consequently, a number of gaps between the sheets is reduced. Therefore, quality of welding busbar 2 to terminals 8 is improved. Since first welded portions 20 are thick, strength of welding is improved. Therefore, vibration resistance and shock resistance of busbar 2 is improved.

Second Exemplary Embodiment

Figure 3:
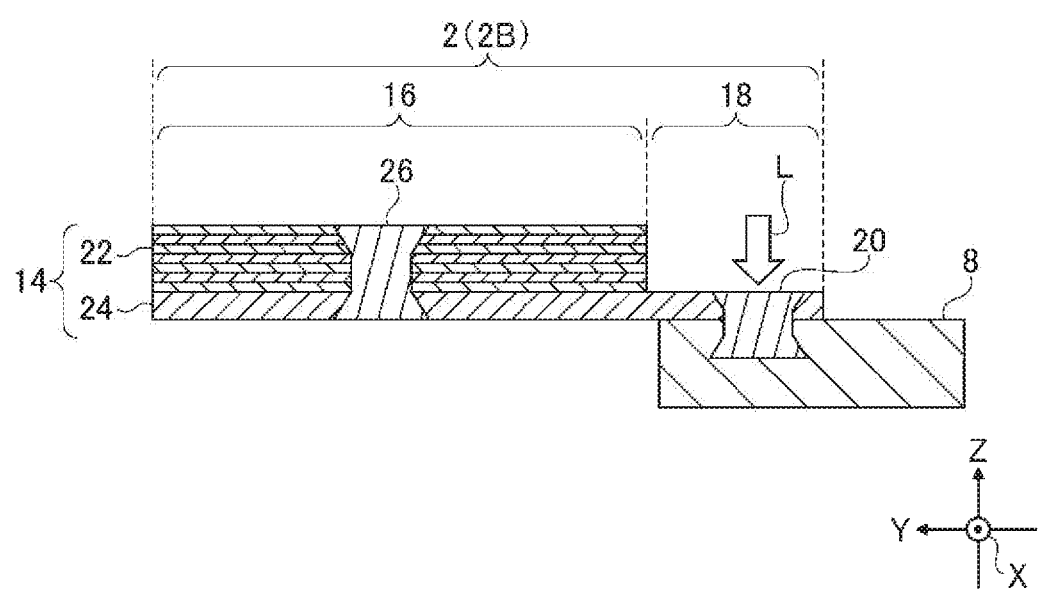
FIG. 3 is a schematic cross-sectional view that illustrates a configuration of a busbar according to the second exemplary embodiment.

A busbar according to a second exemplary embodiment and the busbar according to the first exemplary embodiment have a same configuration except for a difference in configuration between respective second sheets. Hereinafter, a difference in configuration between the busbar according to the present exemplary embodiment and the busbar according to the first exemplary embodiment will be mainly described. A same configuration will be simply described, or will not be described. FIG. 3 is a schematic cross-sectional view that illustrates a configuration of a busbar according to the second exemplary embodiment.

In the present exemplary embodiment, busbar 2 (2B) has main body 16 that extends along axis X along which batteries 4 are stacked together. Busbar 2 (2B) also has a plurality of connectors 18 that are each thinner than main body 16. Emitting laser beam L makes first welded portions 20. First welded portions 20 join connectors 18 to terminals 8 of the plurality of batteries 4, respectively. Further, busbar 2 includes a plurality of sheets 14 stacked together. The plurality of sheets 14 include first sheets 22 and second sheets 24. First sheets 22 constitute main body 16. Second sheets 24 constitute main body 16 and the plurality of connectors 18. Main body 16 has second welded portions 26 that join the plurality of sheets 14 together that constitute main body 16.

At least one or some of second sheets 24 are each thicker than each of first sheets 22. In the present exemplary embodiment, a number of second sheet 24 is one. One second sheet 24 is thicker than each of first sheets 22. One second sheet 24 has a thickness of 0.6 mm, for example. If a number of second sheets 24 is plural, one or some of second sheets 24 may each be thicker than each of first sheets 22. Alternatively, all second sheets 24 may each be thicker than each of first sheets 22.

As described above, in the present exemplary embodiment, at least one or some of second sheets 24 of busbar 2 are each thicker than each of first sheets 22 of busbar 2. Consequently, a number of second sheets 24 that constitute connectors 18 is further reduced. Consequently, a number of gaps between the sheets is further reduced. Therefore, strength of first welded portions 20 is secured. Further, busbar 2 is flexible since thin first sheets 22 are stacked together.

Third Exemplary Embodiment

Figure 4:
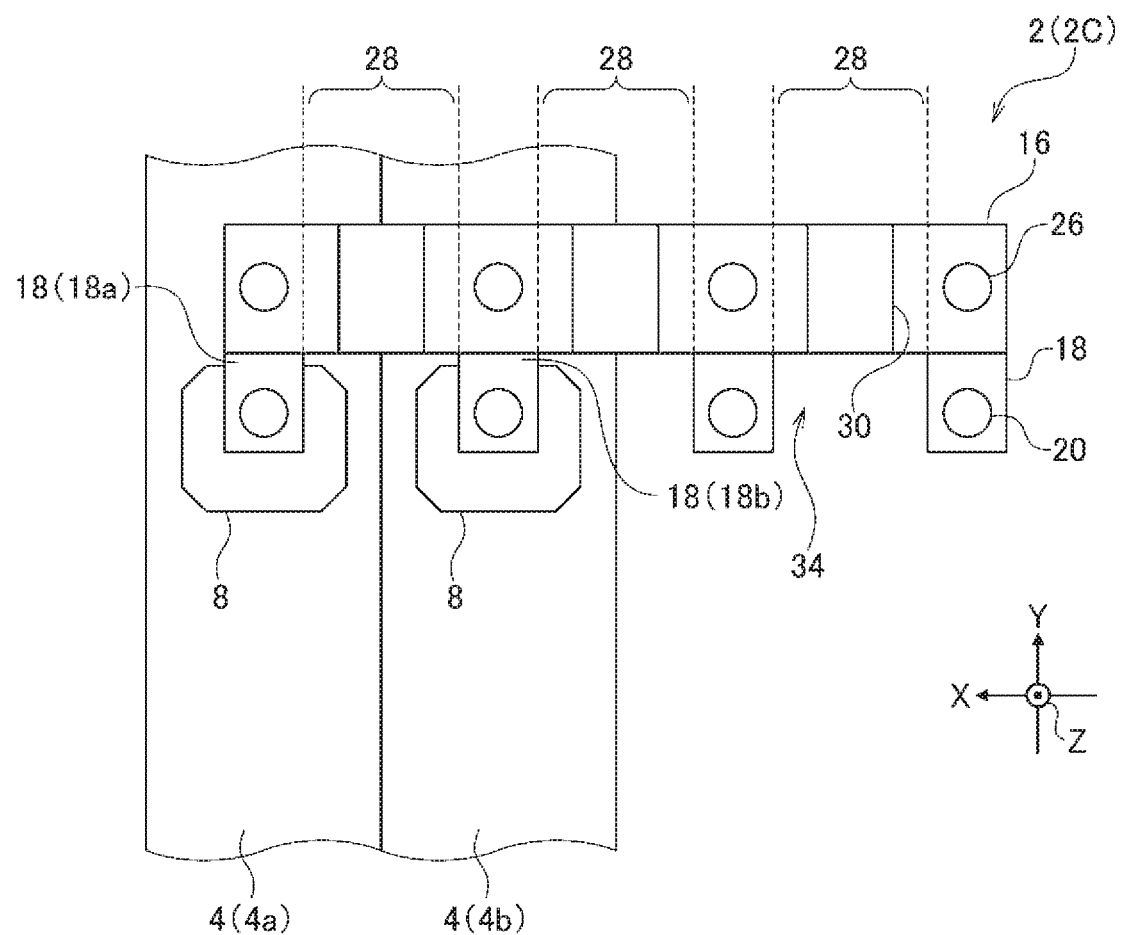
FIG. 4 is a schematic plan view that illustrates a configuration of a busbar according to a third exemplary embodiment.
Figure 5A:
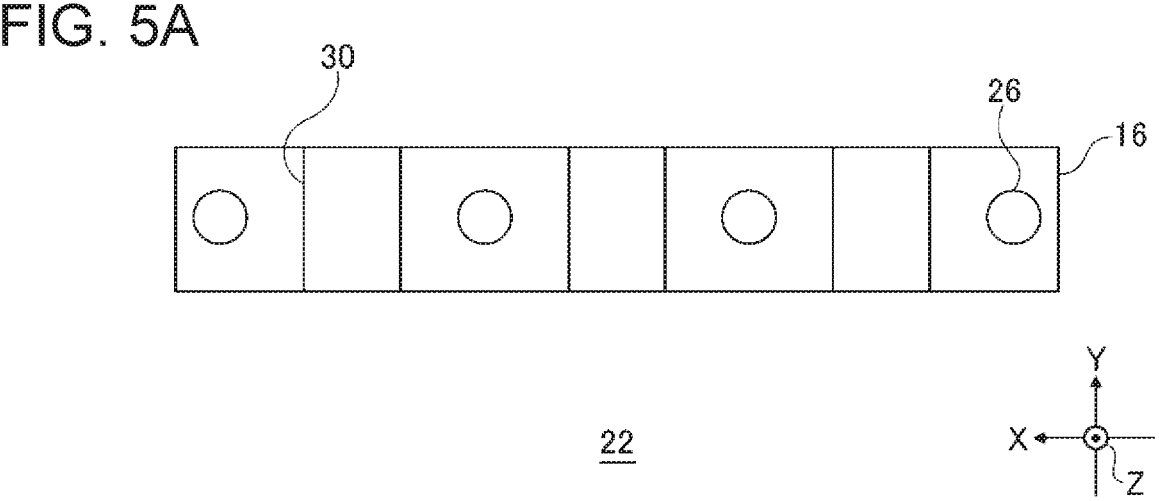
FIG. 5A is a schematic plan view that illustrates a configuration of first sheets.
Figure 5B:
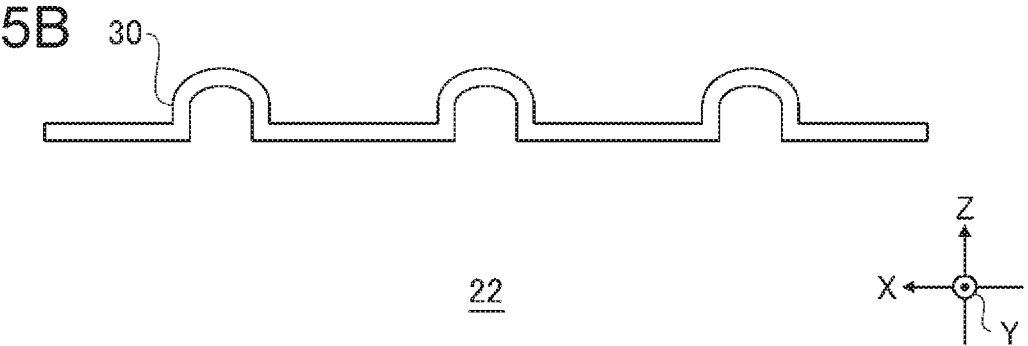
FIG. 5B is a schematic side view that illustrates the first sheets.
Figure 6A:
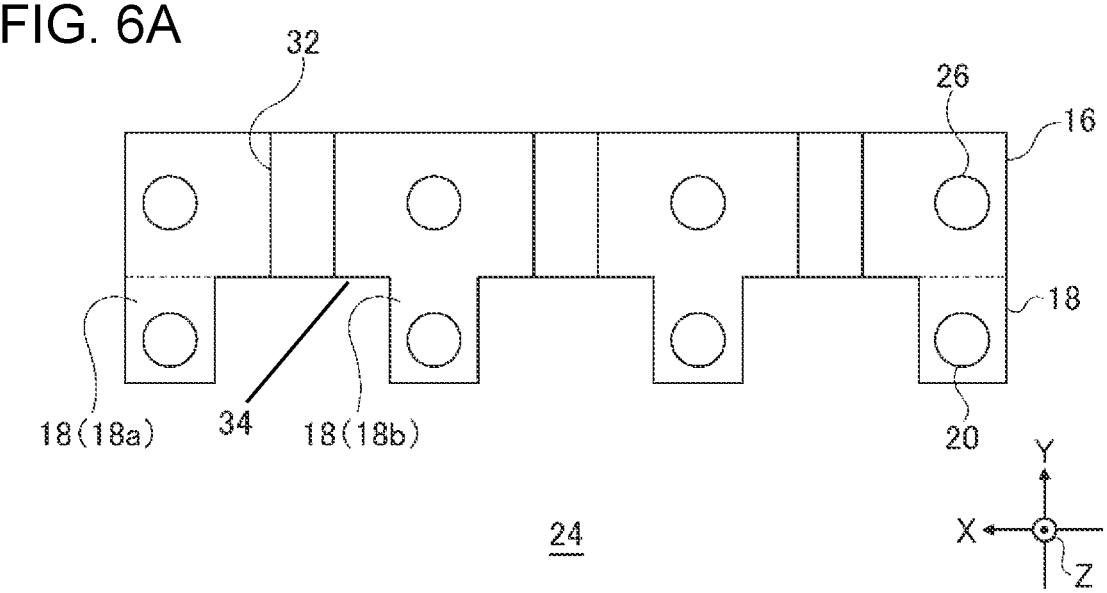
FIG. 6A is a schematic plan view that illustrates a configuration of second sheets.
Figure 6B:
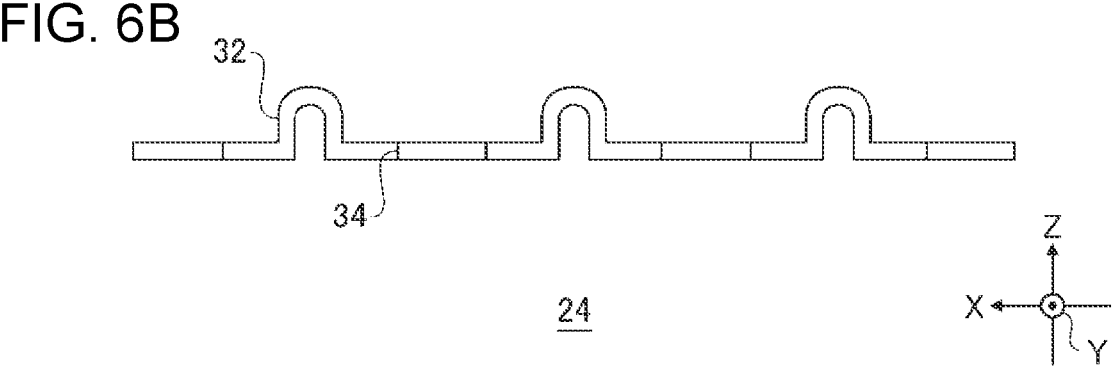
FIG. 6B is a schematic side view that illustrates a configuration of the second sheets.

A busbar according to a third exemplary embodiment and the busbar according to the first or second exemplary embodiment have a same configuration except for a difference in configuration between respective first and second sheets. Hereinafter, a difference in configuration between the busbar according to the present exemplary embodiment and the busbar according to the first or second exemplary embodiment will be mainly described. A same configuration will be simply described, or will not be described. FIG. 4 is a schematic plan view that illustrates a configuration of a busbar according to the third exemplary embodiment. FIG. 5A is a schematic plan view that illustrates a configuration of first sheets. FIG. 5B is a schematic side view that illustrates the first sheets. FIG. 6A is a schematic plan view that illustrates a configuration of second sheets. FIG. 6B is a schematic side view that illustrates a configuration of the second sheets.

In the present exemplary embodiment, busbar 2 (2C) has main body 16 that extends along axis X along which batteries 4 are stacked together. Busbar 2 (2C) also has a plurality of connectors 18 that are each thinner than main body 16. First welded portions 20 join connectors 18 to terminals 8 of the plurality of batteries 4, respectively. Further, busbar 2 includes a plurality of sheets 14 stacked together (see FIG. 2B). The plurality of sheets 14 include first sheets 22 and second sheets 24. First sheets 22 constitute main body 16. Second sheets 24 constitute main body 16 and the plurality of connectors 18. Main body 16 has second welded portions 26 that join the plurality of sheets 14 together that constitute main body 16.

Busbar 2 has displacement allowing portion 28 between first connector 18*a* and second connector 18*b*. First connector 18*a* and second connector 18*b* are arranged along axis X along which batteries 4 are stacked together. First connector 18*a* is welded to any first battery 4*a*. Second connector 18*b* is welded to second battery 4*b* that is adjacent to first battery 4*a*. Displacement allowing portion 28 allows relative displacement (=deviation, or movement) of first battery 4*a* and second battery 4*b* relative to each other.

As illustrated in FIGS. 5A and 5B, displacement allowing portion 28 includes first movable portion 30 of first sheets 22. Part of first movable portion 30 extends along an axis that intersects with a surface of the sheets. That is to say, the part of first movable portion 30 extends away from battery 4, or in a direction where a distance between battery 4 and first movable portion 30 becomes close or apart. In the present exemplary embodiment, first movable portion 30 is U-shaped and protrudes along vertical axis Z that intersects with XY plane.

As illustrated in FIGS. 6A and 6B, displacement allowing portion 28 includes second movable portion 32 of second sheets 24. Second movable portion 32 is at part of second sheets 24. The part of second sheets 24 constitutes main body 16. Part of second movable portion 32 extends along an axis that intersects with a surface of the sheets. In the present exemplary embodiment, second movable portion 32 is U-shaped and protrudes along vertical axis Z that intersects with XY plane. Second movable portion 32 fits in first movable portion 30 when first sheets 22 and second sheets 24 are stacked together.

Further, displacement allowing portion 28 has narrow portion 34 of second sheets 24. Narrow portion 34 of second sheets 24 has a width along an axis that intersects with axis X along which batteries 4 are stacked together. The width of narrow portion 34 is narrower than a width of a portion of second sheets 24 that has connector 18. In the present exemplary embodiment, second sheets 24 each have a shape like a comb. Tooth portions of second sheets 24 correspond to connectors 18, respectively. A portion of second sheets 24 between teeth corresponds to narrow portion 34.

As described above, in the present exemplary embodiment, busbar 2 has displacement allowing portion 28 between first connector 18*a* and second connector 18*b*. First connector 18*a* and second connector 18*b* are arranged along axis X along which batteries 4 are stacked together. First connector 18*a* is welded to first battery 4*a*. Second connector 18*b* is welded to second battery 4*b*. Displacement allowing portion 28 allows relative movement of first battery 4*a* and second battery 4*b* relative to each other. Displacement allowing portion 28 has first movable portion 30 of first sheets 22, and second movable portion 32 of second sheets 24 and narrow portion 34 of second sheets 24.

Part of first movable portion 30 extends along an axis that intersects with a surface of the sheets. Further, part of second movable portion 32 extends along an axis that intersects with a surface of the sheets. Consequently, especially when first battery 4*a* or second battery 4*b* moves away from each other, busbar 2 deforms. Consequently, busbar 2 allows the movement. In the present exemplary embodiment, first movable portion 30 and second movable portion 32 are each U-shaped and protrude along vertical axis Z. Therefore, first movable portion 30 and second movable portion 32 allow movement of each of batteries 4 along axis X along which batteries 4 are stacked together and vertical axis Z, and allow dimensional variation in batteries 4 along axis X along which batteries 4 are stacked together and vertical axis Z. Further, narrow portion 34 is a narrow portion of second sheets 24. The narrow portion of second sheets 24 is between first connector 18*a* and second connector 18*b*. Due to narrow portion 34, busbar 2 is more flexible. Consequently, when first battery 4*a* or second battery 4*b* moves relative to each other, busbar 2 deforms. Consequently, busbar 2 allows the movement. Especially if each of second sheets 24 is thicker than each of first sheets 22, as in the second exemplary embodiment, rigidity of connectors 18 and rigidity of main body 16 increase. Therefore, arrangement of displacement allowing portions 28 is preferable.

Fourth Exemplary Embodiment

Figure 7A:
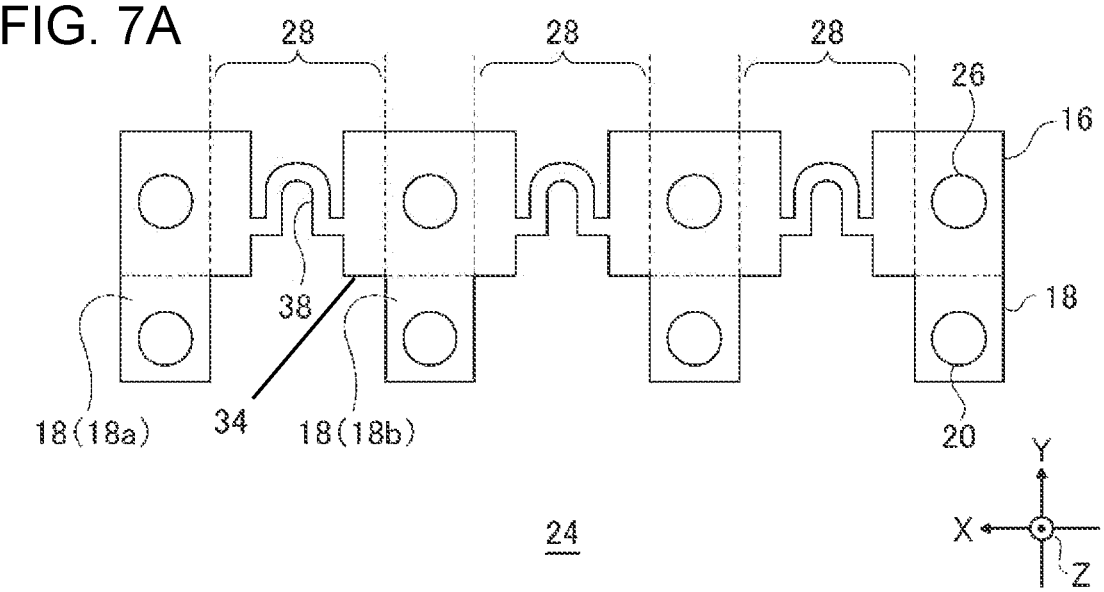
FIG. 7A is a schematic plan view that illustrates a configuration of second sheets of a busbar according to a fourth exemplary embodiment.
Figure 7B:
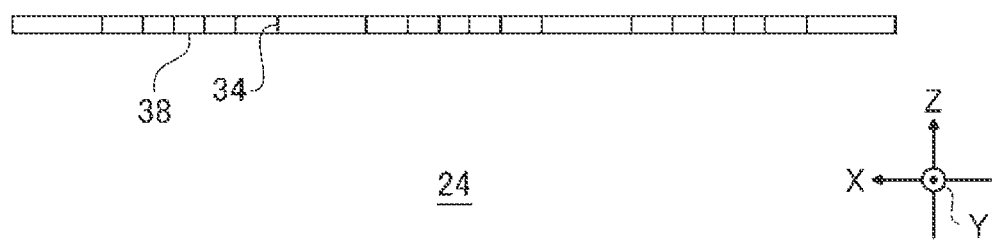
FIG. 7B is a schematic side view that illustrates the second sheets.

A busbar according to a fourth exemplary embodiment and the busbar according to the third exemplary embodiment have a same configuration except for a difference in configuration between respective displacement allowing portions. Hereinafter, a difference in configuration between the busbar according to the present exemplary embodiment and the busbars according to the first to third exemplary embodiments will be mainly described. A same configuration will be simply described, or will not be described. FIG. 7A is a schematic plan view that illustrates a configuration of second sheets of a busbar according to the fourth exemplary embodiment. FIG. 7B is a schematic side view that illustrates the second sheets.

In the present exemplary embodiment, busbar 2 has main body 16 that extends along axis X along which batteries 4 are stacked together. Busbar 2 also has a plurality of connectors 18 that are each thinner than main body 16. First welded portions 20 join connectors 18 to terminals 8 of the plurality of batteries 4, respectively. Further, busbar 2 includes a plurality of sheets 14 stacked together (see FIG. 2B). The plurality of sheets 14 include first sheets 22 and second sheets 24. First sheets 22 constitute main body 16 (see FIGS. 5A and 5B). Second sheets 24 constitute main body 16 and the plurality of connectors 18. Main body 16 has second welded portions 26 that join the plurality of sheets 14 together that constitute main body 16.

Busbar 2 has displacement allowing portion 28 between first connector 18*a* and second connector 18*b*. First connector 18*a* and second connector 18*b* are arranged along axis X along which batteries 4 are stacked together. Displacement allowing portion 28 has first movable portion 30 of first sheets 22 (see FIGS. 5A and 5B).

As illustrated in FIGS. 7A and 7B, each of displacement allowing portions 28 has narrow portion 34 and third movable portion 38 of second sheets 24. Part of third movable portion extends along a direction intersecting with axis X along which batteries 4 are stacked together and along a surface of the sheets. In the present exemplary embodiment, third movable portion 38 has a narrow width and has a small cross section, or is a thin wire. Further, third movable portion 38 has a curved portion that protrudes along horizontal axis Y within surfaces of second sheets 24. Third movable portion 38 has a spring structure, and thus elastically deforms when batteries 4 move.

As described above, in the present exemplary embodiment, busbar 2 has displacement allowing portion 28 that allows relative movement of first battery 4*a* and second battery 4*b* relative to each other. Busbar 2 electrically connects first battery 4*a* with second battery 4*b*. Displacement allowing portion 28 has third movable portion 38 of second sheets 24. Part of third movable portion 38 intersects with axis X along which batteries 4 are stacked together, and extends along a surface of the sheets. Consequently, especially when first battery 4*a* or second battery 4*b* moves away from each other, busbar 2 deforms. Consequently, busbar 2 allows the movement. In the present exemplary embodiment, third movable portion 38 has a narrow width and has a small cross section. Therefore, third movable portion 38 allows movement of each of batteries 4 along axis X along which batteries 4 are stacked together, horizontal axis Y, and vertical axis Z, and allows dimensional variation in batteries 4 along axis X along which batteries 4 are stacked together, horizontal axis Y, and vertical axis Z.

Fifth Exemplary Embodiment

Figure 8A:
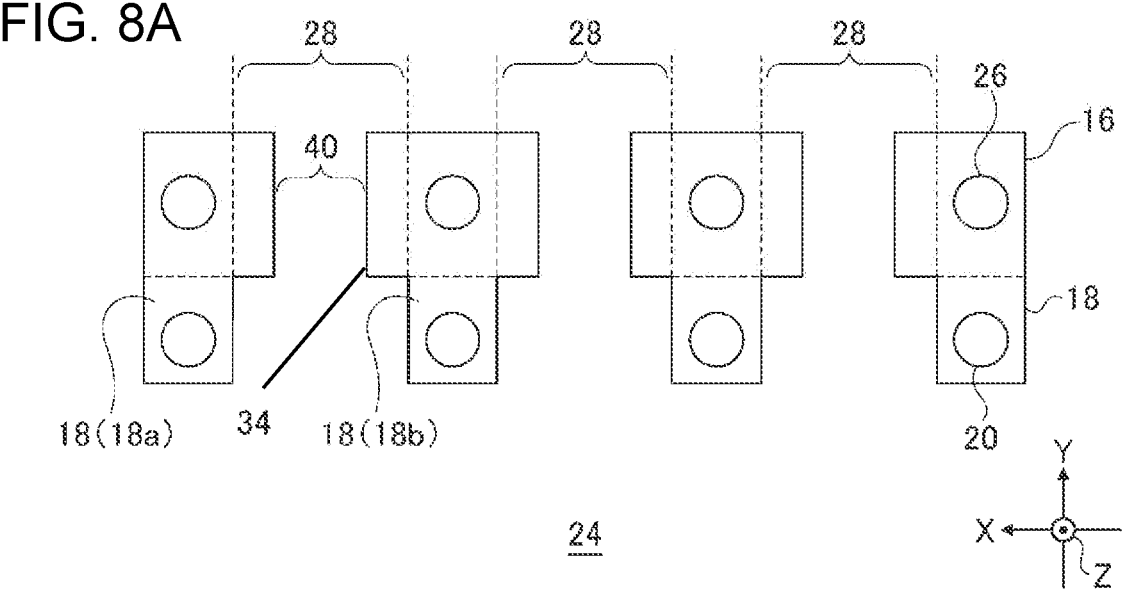
FIG. 8A is a schematic plan view that illustrates a configuration of second sheets of a busbar according to a fifth exemplary embodiment.
Figure 8B:
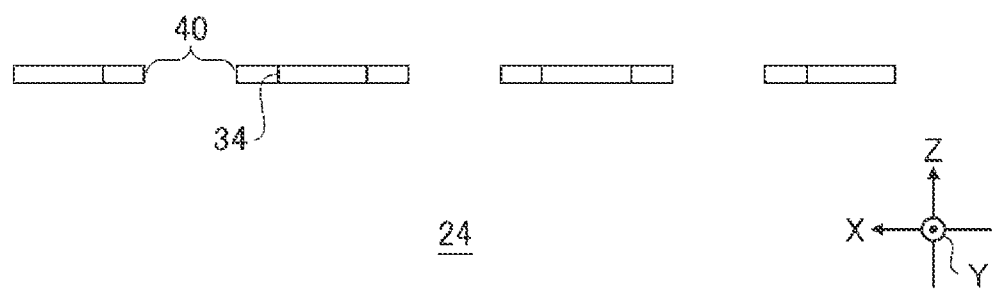
FIG. 8B is a schematic side view that illustrates a configuration of the second sheets.

A busbar according to a fifth exemplary embodiment and the busbar according to the third exemplary embodiment have a same configuration except for a difference in configuration between respective displacement allowing portions. Hereinafter, a difference in configuration between the busbar according to the present exemplary embodiment and the busbars according to the first to third exemplary embodiments will be mainly described. A same configuration will be simply described, or will not be described. FIG. 8A is a schematic plan view that illustrates a configuration of second sheets of a busbar according to the fifth exemplary embodiment. FIG. 8B is a schematic side view that illustrates a configuration of the second sheets.

In the present exemplary embodiment, busbar 2 has main body 16 that extends along axis X along which batteries 4 are stacked together. Busbar 2 also has a plurality of connectors 18 that are each thinner than main body 16. First welded portions 20 join connectors 18 to terminals 8 of the plurality of batteries 4, respectively. Further, busbar 2 includes a plurality of sheets 14 stacked together (see FIG. 2B). The plurality of sheets 14 include first sheets 22 and second sheets 24. First sheets 22 constitute main body 16 (see FIGS. and 5A and 5B). Second sheets 24 constitute main body 16 and the plurality of connectors 18. Main body 16 has second welded portions 26 that join the plurality of sheets 14 together that constitute main body 16.

Busbar 2 has displacement allowing portion 28 between first connector 18*a* and second connector 18*b*. First connector 18*a* and second connector 18*b* are arranged along axis X along which batteries 4 are stacked together. Displacement allowing portion 28 has first movable portion 30 of first sheets 22 (see FIGS. 5A and 5B).

As illustrated in FIGS. 8A and 8B, displacement allowing portion 28 has space 40 of second sheets 24. Space 40 separates first connector 18a from second connector 18b. Consequently, busbar 2 becomes more flexible. Consequently, when first battery 4a or second battery 4b moves relative to each other, busbar 2 deforms. Consequently, busbar 2 allows the movement. In the present exemplary embodiment, space 40 allows movement of each of batteries 4 along axis X along which batteries 4 are stacked together, horizontal axis Y, and vertical axis Z, and allows dimensional variation in batteries 4 along axis X along which batteries 4 are stacked together, horizontal axis Y, and vertical axis Z.

Sixth Exemplary Embodiment

Figure 9A:
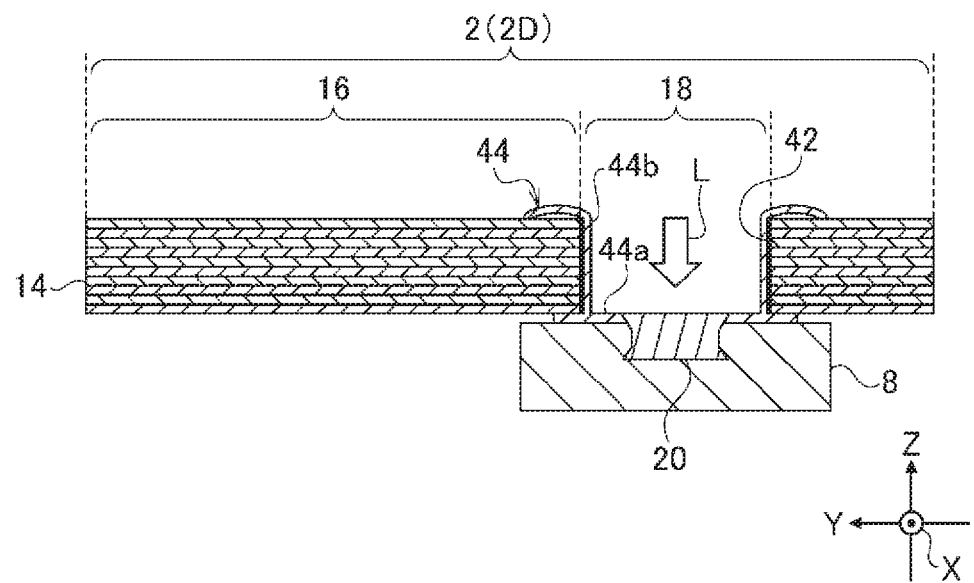
FIG. 9A is a schematic cross-sectional view that illustrates a configuration of a busbar according to a sixth exemplary embodiment.

A busbar according to a sixth exemplary embodiment and the busbar according to the first exemplary embodiment have a same configuration except for a difference in configuration between respective connectors. Hereinafter, a difference in configuration between the busbar according to the present exemplary embodiment and the busbar according to the first exemplary embodiment will be mainly described. A same configuration will be simply described, or will not be described. FIG. 9A is a schematic cross-sectional view that illustrates a configuration of a busbar according to the sixth exemplary embodiment.

In the present exemplary embodiment, busbar 2 (2D) has main body 16 that extends along axis X along which batteries 4 are stacked together. Busbar 2 (2D) also has a plurality of connectors 18 that are each thinner than main body 16. Emitting laser beam L makes first welded portions 20. First welded portions 20 join connectors 18 to terminals 8 of the plurality of batteries 4, respectively.

Further, busbar 2 includes a plurality of sheets 14 stacked together. The plurality of sheets 14 each have a shape like a comb. Part of the plurality of sheets 14 that extends along axis X along which batteries 4 are stacked together constitutes main body 16. Each of sheets 14 has portions that correspond to teeth, respectively. That is to say, each of sheets 14 has portions that protrude along horizontal axis Y from a portion of sheet 14 that constitutes main body 16. The portions have through holes 42, respectively. Through holes 42 extend along an axis along which sheets 14 are stacked together.

Fastening components 44 fit in through holes 42, respectively. Each of fastening components 44 is made of a metal sheet that is thinner than a total thickness of the plurality of sheets 14. Fastening component 44 has bottom 44a and wall 44b. Bottom 44a is larger than an opening of through hole 42 that is close to terminal 8. Bottom 44a fills the opening. Wall 44b extends from bottom 44a along an inner surface of through hole 42. An end of wall 44b protrudes upward from a surface of main body 16. The surface of main body 16 is opposite terminal 8. The end that protrudes is bent outward. Consequently, fastening component 44 fastens the plurality of sheets 14. That is to say, the plurality of sheets 14 are caulked or rivetted together with fastening component 44. Fastening component 44 may be fixed to the plurality of sheets 14 by welding.

Bottom 44a of fastening component 44 constitutes connector 18. That is to say, bottom 44a is disposed in contact with terminal 8. Laser beam L is emitted onto bottom 44a. Consequently, first welded portion 20 is made at bottom 44a. First welded portion 20 joins bottom 44a to terminal 8.

Therefore, in the present exemplary embodiment, connectors 18 of busbar 2 are each thinner than main body 16 of busbar 2.

As described above, in the present exemplary embodiment, busbar 2 includes main body 16 that includes the plurality of sheets 14. Further, connectors 18 include fastening components 44, respectively. Fastening components 44 are each thinner than a total thickness of the plurality of sheets 14. Fastening components 44 fasten the plurality of sheets 14. Consequently, busbar 2 is securely welded to terminals 8 with low power. Further, the plurality of sheets 14 are not welded to each other.

The present invention is not limited to the above exemplary embodiments. Some of the exemplary embodiments may be combined together. Alternatively, the exemplary embodiments may be modified based on knowledge of the person of ordinary skill in the art. For example, designs of the exemplary embodiments may be variously modified. If some of the exemplary embodiments are combined together, a resultant exemplary embodiment falls within the scope of the present invention. Further, if the exemplary embodiments are modified, resultant exemplary embodiments also fall within the scope of the present invention. If some of the exemplary embodiments are combined together, a resultant exemplary embodiment has effects of the exemplary embodiments that have been combined together. Further, if the exemplary embodiments are modified, resultant exemplary embodiments each have an additional effect of the modification.

Figure 9B:
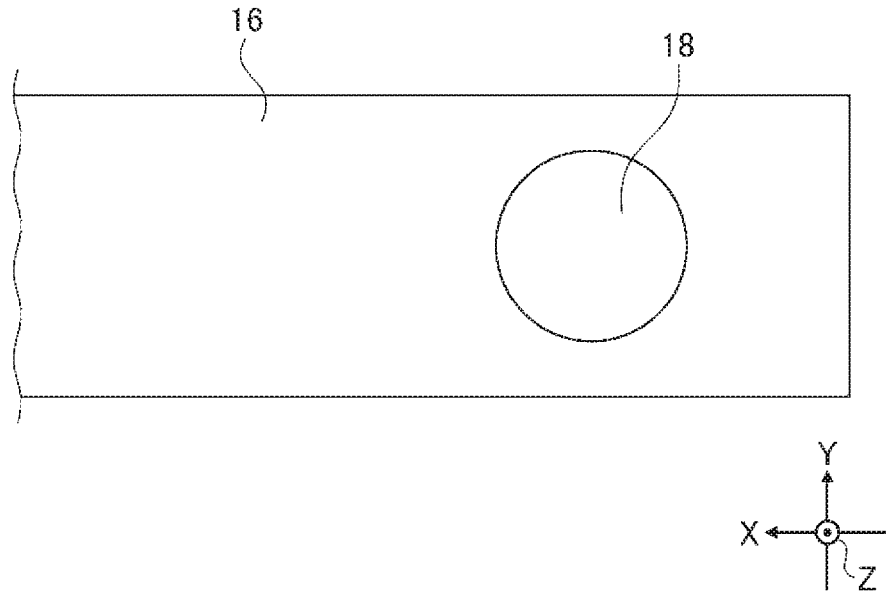
FIG. 9B is a schematic plan view that illustrates part of a busbar according to an example of variations.

In the above exemplary embodiments, batteries 4 are prismatic batteries. However, a shape of batteries 4 is not particularly limited and may be cylindrical, for example. Further, a total number of batteries 4 of battery module 1 is not particularly limited. A number of batteries 4 of each of the battery units is not particularly limited. Further, exterior cans of batteries 4 may be each covered with an insulating sheet, such as a heat shrink tube. A shape of busbar 2 is not limited to a shape like a comb. Busbar 2 may be straight in such a manner that both ends of main body 16 each have connector 18. A busbar according to the sixth exemplary embodiment is exemplified. As illustrated in FIG. 9B, busbar 2 has main body 16 that is straight and extends along axis X along which batteries 4 are stacked together. Further, connectors 18 are arranged at both ends of main body 16, respectively. FIG. 9B is a schematic plan view that illustrates part of a busbar according to an example of variations.

Further, in each of the exemplary embodiments, bases of connectors 18 may include movable portions (not illustrated), respectively, for example. The bases of connectors 18 are connected with main body 16. Movable portions extend along an axis that intersects with XY plane. The movable portions are made by bending the bases of connectors 18. Consequently, movement of batteries 4 along horizontal axis Y is mainly allowed. Further, dimensional variation in batteries 4 along horizontal axis Y is mainly allowed.

The invention claimed is:

1. A busbar that includes a plurality of sheets stacked together, the busbar comprising:
   a main body that extends along a first axis along which a plurality of batteries are stacked together; and
   a plurality of connectors that are each thinner than the main body, and are configured to be welded to terminals of the plurality of batteries, respectively, wherein:
   the plurality of sheets include a first sheet that constitutes only the main body, and a second sheet that constitutes the main body and the plurality of connectors, the main body has a plurality of welded portions that join the first sheet and the second sheet within the main body, the first sheet does not overlap the plurality of connectors in a direction where the plurality of sheets are stacked, and the plurality of connectors protrude from at one side of the main body along a second axis crossing the first axis in plan view.

2. The busbar according to claim 1, wherein at least part of the second sheet is thicker than the first sheet.

3. The busbar according to claim 1, wherein the second sheet is formed of multiple sheets.

4. The busbar according to claim 1, wherein:
the plurality of connectors comprises a first connector and a second connector,
the first connector and the second connector are arranged along the first axis, and the first connector is configured to be welded to a first battery and the second connector is configured to be welded to a second battery,
the busbar has a displacement allowing portion between the first connector and the second connector, and
the displacement allowing portion is configured to allow relative movement of the first battery and the second battery relative to each other.

5. The busbar according to claim 4, wherein:
the displacement allowing portion has a first movable portion of the first sheet, and
part of the first movable portion extends along a third axis that intersects with a surface of the main body.

6. The busbar according to claim 4, wherein:
the displacement allowing portion has a narrow portion of the second sheet, and
the narrow portion of the second sheet has a width along the second axis, and the width of the narrow portion is narrower than a length of extending portions of the plurality of connectors.

7. The busbar according to claim 4, wherein:
the displacement allowing portion has a second movable portion of the second sheet, and
part of the second movable portion extends along the third axis.

8. The busbar according to claim 4, wherein:
the displacement allowing portion has a third movable portion of the second sheet, and
part of the third movable portion extends along a third axis intersecting with a surface of the main body.

9. The busbar according to claim 4, wherein:
the displacement allowing portion has a space dividing the second sheet into two pieces, and
the space separates the first connector from the second connector.

10. The busbar according to claim 1, wherein:
the plurality of connectors each include a fastening component,
the fastening component is thinner than a total thickness of the plurality of sheets, and
fastening component fastens the plurality of sheets.

11. A battery module comprising:
the busbar according to claim 1; and
the plurality of batteries that are electrically connected with each other by the busbar.

12. The battery module according to claim 11, wherein:
the plurality of batteries are divided into a plurality of battery units, each of the plurality of battery units includes at least two of the plurality of batteries,
the busbar connects the at least two of the plurality of batteries of each of the battery units with each other in parallel, and the busbar connects the battery units with each other in series, and
a thickness of the main body of the busbar is twice or more as large as a thickness of the plurality of connectors of the busbar.

13. The busbar according to claim 1, wherein the first sheet is formed of multiple sheets and the second sheet is a single sheet.

* * * * *